Sept. 30, 1958      L. GAMBONI      2,854,040

AUTOMATIC COPYING MACHINE

Filed March 28, 1956      2 Sheets-Sheet 1

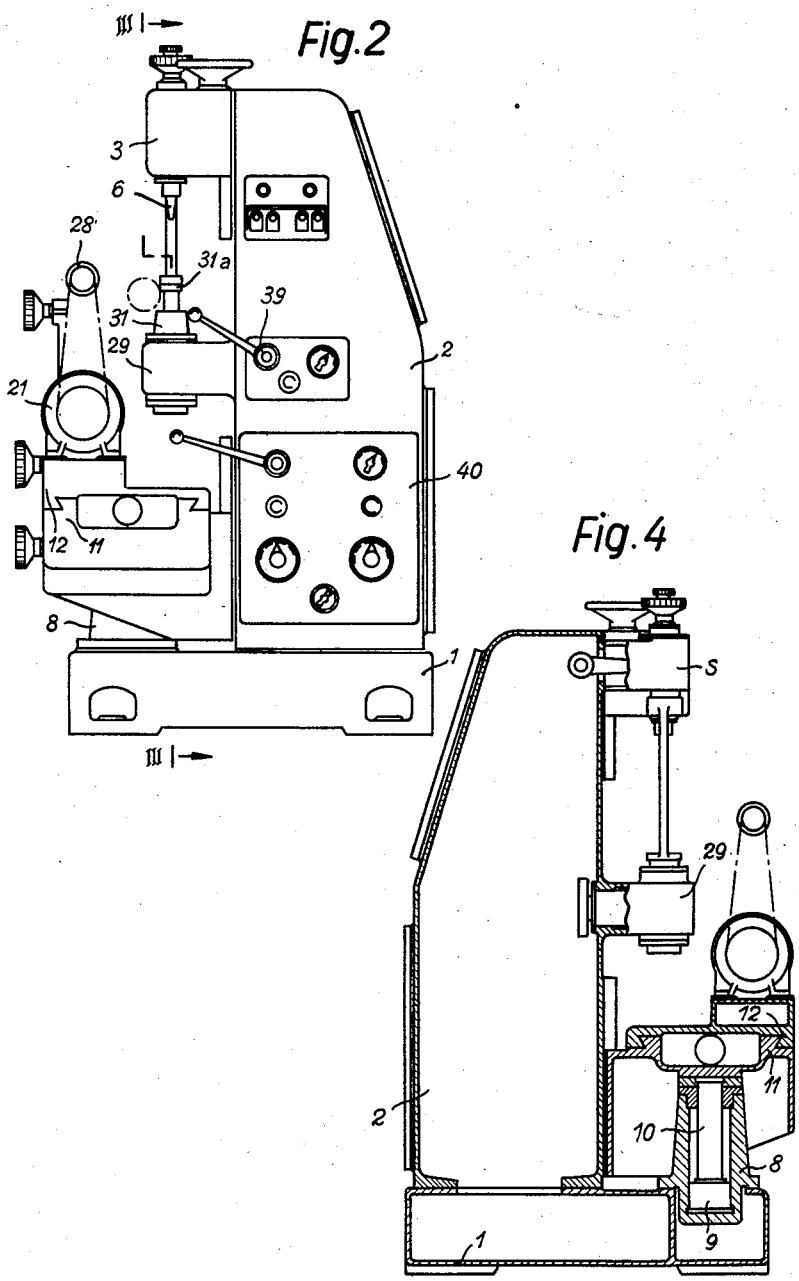

United States Patent Office 2,854,040
Patented Sept. 30, 1958

2,854,040

AUTOMATIC COPYING MACHINE

Leonello Gamboni, Milan, Italy, assignor to Incoma S. p. A., Milan, Italy

Application March 28, 1956, Serial No. 574,419

Claims priority, application Italy April 1, 1955

2 Claims. (Cl. 142—7)

This invention relates to an automatic copying machine with a tracing device freely rotatable about an axis perpendicular to the axis of rotation of the template and rotary tools for the three-dimensional working of workpieces of wood or the like, of the type in which the template and workpieces rotate at the same angular speed about parallel axes.

The machine can be used for working shoe heels, smoking pipe heads and other regular or irregular workpieces of wood, leather or other materials.

The automatic copying machine according to this invention comprises a plurality of working stations for working separate pieces, each station including a head driven in rotation and provided with means for gripping the workpiece, at least two sets of tools rotatable about an axis substantially perpendicular to the axis of rotation of the head and adapted to perform two different types of work, the tools of one set alternating with the tools of the other set, said tool sets being driven by one tracing device cooperating with a rotatable template, and means for simultaneously displacing all the tools from one working station to the next one on completing the work on each workpiece by one tool of one set, for the purpose of working the said workpiece by one tool of the other set.

The invention shall now be described by way of example with reference to the accompanying drawing, wherein:

Figure 2 is an end view thereof,

Figure 4 is a sectional view of Figure 1 on line IV—IV.

Figure 1:
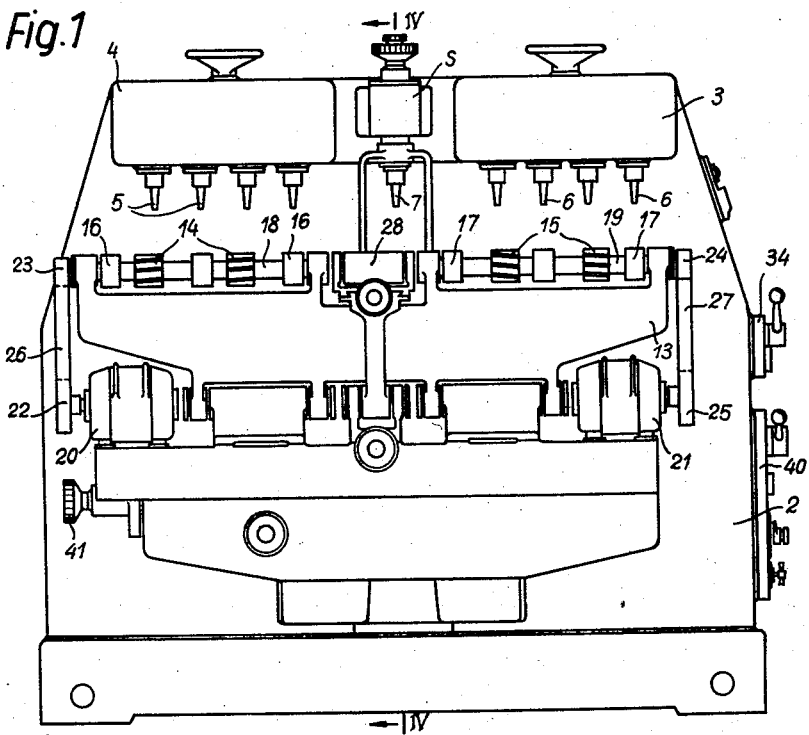
Figure 1 is a front view of the improved machine.
Figure 3:
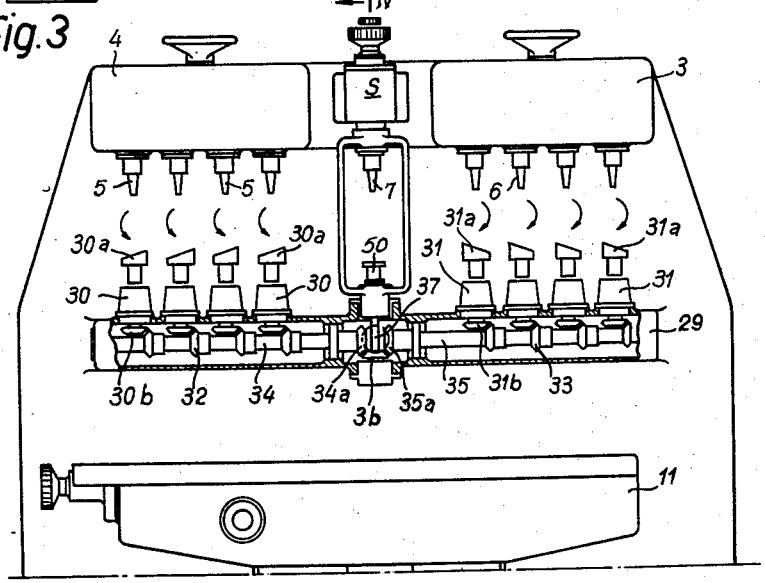
Figure 3 is a sectional view of Figure 2 on line III—III.

The improved machine comprises a bedplate 1 having mounted thereon a body 2 carrying the boxes 3, 4 supporting the axially movable tail centers 5, 6, respectively for centering the workpieces and a box S supporting the tail centre 7 for the template.

The bedplate 1 has further mounted thereon a cylinder 8 in which a piston 9 moves vertically, the piston rod 10 carrying a slide 11 on which a table 12 is moved horizontal by a hydraulic ram. The table stroke is adjustable by means of a handle 41, the table carrying, swingable on a horizontal axis, an arm 13 supporting coarse working tools 14, 15 and finishing tools 16, 17.

The tools 14, 16 are mounted on one shaft 18, the tools 15, 17 being mounted on one shaft 19, the said shafts being horizontal and orthogonal to the axes of rotation of the workpieces and being carried parallel to the swing axis of the arm 13 by supports secured to the arm.

The shafts 18, 19 are driven by motors 20, 21, respectively through pulleys 22, 23 and 24, 25, respectively, and belts 26, 27, respectively. The shafts of the motors 20, 21 are co-axial with the swing axis of the swing arm 13.

A tracer roller 28 is arranged coaxial with the shafts 18, 19 and cooperates with the template (not shown on the drawing).

The body 2 of the machine has further mounted thereon a box 29 carrying the heads for supporting and holding the workpieces and enclosing the mechanisms for actuation thereof.

The heads arranged on both sides of the template are denoted by 30, 31, respectively, the said heads being provided with means diagrammatically shown at 30a and 31a on the drawing for gripping the workpieces and keeping them against the centers 5, 6, respectively during rotation.

The shafts of the heads 30, 31 carry at their lower end bevel wheels 30b, 31b, respectively, meshing with bevel wheels 32, 33 carried by shafts 34, 35, respectively.

The facing ends of the shafts 34 and 35 carry toothed wheels 34a, 35a meshing with a toothed wheel 36 keyed on a vertically arranged shaft 37 carrying the template holder 50 at its top.

The shafts 34, 35 and 37 are rotated by a hydraulic motor (not shown on the drawing).

With the arrangement as described the heads situated on one side of the template rotate in an opposite direction to the heads placed on the other side of the template, whereby right-handed and left-handed workpieces of mutually symmetrical form and even size can be manufactured.

The workpieces are worked by vertically feeding the slide 11 having slidable thereon the table 12 on which the swing arm 13 carrying the working tools is mounted.

The tracer roller 28 is advantageously connected to an appropriate enlarging-reducing mechanism whereby the swinging movements of the roller and arm may be correlated in a manner known per se so as to effect a three-dimensional magnification or reduction of the workpiece with respect to the template.

The machine is driven through a set of centralised hydraulic controls, of which the control panels are denoted by 39 and 40 in Figure 2. Locking and release of the workpieces is effected by the lever 39 on the panel through axial displacement of the tail centers.

The described machine operates as follows:

Assuming the rotary tools have each completed their work on the workpiece, whereby alternate workpieces have been finished by the finishing tools 16, 17, the remaining alternate workpieces having been worked by the rough cutters 14, 15, the machine is stopped and the hydraulic cylinder 8 is operated to lower the slide 11 and table 12, and subsequently the finished workpieces are removed and blanks to be worked are substituted therefor. The control handwheel 41 is then operated to move the table 12 horizontally with respect to the row of working stations 5—30a and 6—31a, so that the finishing tools 16, 17 are opposite the workpieces previously worked by the rough cutters 14, 15. Upon this movement of the table 12, the rough cutters come opposite the blanks freshly placed on the machine.

The machine is then started, the finishing tools acting on previously rough cut workpieces, the rough cutters acting on the blanks.

It will be seen that all the tools are bodily controlled from the template follower 28. Consequently, the rough cutters first start their shaping action on the blanks until an angular position of the swing arm 13 is reached in which the finishing tools also engage their associated workpieces. All the tools are henceforth operated under the control of the template follower 28. This is essential not only for the rough cutters 14, 15, but all the more so for the finishing tools 16, 17, which generate on the workpieces a tridimensional profile accurately matching the profile of the template at the same instant at which the rough cutters perform their rough cutting action. As distinct from machines known heretofore, this machine does not, therefore, necessitate transfer of the rough cut workpieces to a finishing machine, nor removal of the rough cutters and replacement thereof by the finishing tools.

Upon completion of this working cycle the machine is again stopped, the finished workpieces are replaced by blanks, the table 12 is returned to the position it occupied before the last-mentioned working cycle. In this manner the rough cutters are again opposite blanks, the finishing tools being opposite rough cut workpieces.

It will be understood that the horizontal movements of the table 12 are selective between two limit positions in order to associate the rough cutters and finishing tools with corresponding workpieces, generation of the workpieces along their axes being performed by supplying hydraulic fluid to the cylinder 8, whereby the slide 11 and table 12 slowly ascend. During this upward movement the follower 28 explores the template throughout its axial length, its movements being imitated by the tools 14, 15, 16, 17 throughout the axial workpiece length.

What I claim is:

1. In a copying machine, a bed, a row of working stations on the bed including each a workpiece holder rotatable about a vertical axis, a rotary template holder on the bed likewise rotatable about a vertical axis, means connecting some of the workpiece holders and template holder for a unison rotary movement in a common direction and connecting the remaining workpiece holders and the template holder for a unison rotary movement in opposite directions, thereby to produce left and right-handed workpieces, a table slidable parallel to the row of working stations on a horizontal plane, a swing arm supported from the table swingable about a horizontal axis parallel with the row of working stations, a template follower supported from the table swingable about a horizontal axis parallel with the row of working stations, a row of axially aligned rotary tools supported from the swing arm on an axis parallel with the swing axis of the arm, whereby all the tools may be simultaneously bodily displaced through equal extents on swinging of the arm, the said tools comprising alternate rough and finishing cutters, and means for selectively displacing the table with respect to the row of working stations, whereby each workpiece may be shaped first from a rough cutter and then from an adjacent finishing cutter.

2. In a copying machine, a bed, a row of working station on the bed subdivided into two sets comprising the same number of working stations including each a workpiece holder rotatable about a vertical axis, a rotary template holder on the bed likewise rotatable about a vertical axis positioned between the two sets of working stations, means connecting the template and the workholders of one set for a unison rotary movement in a common direction and connecting the template holder and the other set for unison rotary movement in opposite directions, thereby to produce right- and respectively left-handed workpieces on the said sets of working stations, a table slidable parallel to the row of working stations on a horizontal plane, a swing arm supported from the table swingable about a horizontal axis parallel to the row of working stations, a template follower supported from the table swingable about a horizontal axis parallel with the row of working stations, a pair of axially aligned shafts supported from the swing arm at opposite sides of the template follower on an axis parallel to the swing axis of the arm, a plurality of axially spaced rotary tools on each of the said shafts supported from the arm, whereby all the tools may be simultaneously bodily displaced through equal extents on swinging of the arm, the said tools comprising alternate rough and finishing cutters, and means for selectively displacing the table axially of the shafts with respect to the row of working stations, whereby each workpiece may be shaped first from a rough cutter and then from an adjacent finishing cutter.

References Cited in the file of this patent

UNITED STATES PATENTS

| 1,363,238 | Duchemin | Dec. 28, 1920 |
| 1,946,253 | Winkle | Feb. 6, 1934 |
| 2,590,378 | Clausing | Mar. 25, 1952 |
| 2,667,901 | Salstrom | Feb. 2, 1954 |
| 2,770,264 | Eklund | Nov. 13, 1956 |

FOREIGN PATENTS

| 283,393 | Great Britain | Jan. 12, 1928 |